(12) United States Patent
Ambler et al.

(10) Patent No.: US 11,267,548 B2
(45) Date of Patent: Mar. 8, 2022

(54) CLUTCH MECHANISMS FOR STEERING CONTROL SYSTEM

(71) Applicant: Rhodan Marine Systems of Florida, LLC, Sarasota, FL (US)

(72) Inventors: Lindsay Ambler, Myakka City, FL (US); Tom Mogle, Simpsonville, SC (US); Charles Armstrong, Bradenton, FL (US); Richard William Ambler, Myakka City, FL (US)

(73) Assignee: Rhodan Marine Systems of Florida, LLC, Sarasota, FL (US)

( * ) Notice: Subject to any disclaimer, the term of this patent is extended or adjusted under 35 U.S.C. 154(b) by 0 days.

(21) Appl. No.: 17/212,805

(22) Filed: Mar. 25, 2021

(65) Prior Publication Data

US 2021/0300515 A1 Sep. 30, 2021

Related U.S. Application Data

(60) Provisional application No. 63/000,773, filed on Mar. 27, 2020.

(51) Int. Cl.
*B63H 20/12* (2006.01)
*B63H 1/14* (2006.01)
(Continued)

(52) U.S. Cl.
CPC ............... *B63H 20/12* (2013.01); *B63H 1/14* (2013.01); *B63H 20/007* (2013.01); *B63H 20/14* (2013.01);
(Continued)

(58) Field of Classification Search
CPC ...... B63H 20/12; B63H 20/007; B63H 20/14; B63H 1/14; B63H 23/06; F16D 7/08; F16D 43/206
See application file for complete search history.

(56) References Cited

U.S. PATENT DOCUMENTS

| 371,016 A | 10/1887 | Williamson |
| 1,910,043 A | 5/1933 | Palm et al. |

(Continued)

FOREIGN PATENT DOCUMENTS

| CN | 2374694 Y | 4/2000 |
| CN | 109533262 A | 3/2019 |

(Continued)

OTHER PUBLICATIONS

International Search Report and Written Opinion issued for International Application No. PCT/US2021/024194, dated Aug. 25, 2021.

*Primary Examiner* — Stephen P Avila
(74) *Attorney, Agent, or Firm* — Goodwin Procter LLP (57) ABSTRACT

This application describes clutch mechanisms for use in a steering control system, e.g., a steering control system used to steer a trolling motor for a boat. Such clutch mechanisms can reduce and avoid damage to the steering control system (e.g., a steering motor) when the system is subjected to unusually large impact loads (e.g., when the trolling motor or boat contacts an obstruction). The clutches described in this application can be used to decouple the steering control system from a steering shaft (or other drive mechanism) upon application of a large impact load, thus reducing damage to and increasing the lifespan of such system. In some cases, the clutch is a ball and spring mechanism. In other cases, the clutch is a slip tooth mechanism.

24 Claims, 8 Drawing Sheets

(51) Int. Cl.
  *B63H 20/00* (2006.01)
  *B63H 20/14* (2006.01)
  *B63H 23/06* (2006.01)
  *F16D 7/08* (2006.01)
  *F16D 43/206* (2006.01)
(52) U.S. Cl.
  CPC ............... *B63H 23/06* (2013.01); *F16D 7/08* (2013.01); *F16D 43/206* (2013.01)

(56) References Cited

U.S. PATENT DOCUMENTS

| | | | |
|---|---|---|---|
| 2,182,404 A | 12/1939 | Maurer | |
| 2,227,392 A | 12/1940 | Kuzmitz | |
| 2,307,264 A * | 1/1943 | Hamlin | B41F 33/00 |
| | | | 101/92 |
| 2,443,491 A | 6/1948 | Andres | |
| 2,573,382 A | 10/1951 | Bannister | |
| 2,609,900 A | 9/1952 | Neracher et al. | |
| 2,877,733 A | 3/1959 | Harris | |
| 2,957,441 A | 10/1960 | Leipert | |
| 3,136,400 A | 6/1964 | Carr | |
| 3,204,732 A | 9/1965 | Morse | |
| 3,404,586 A | 10/1968 | Fanstone | |
| 3,566,633 A | 3/1971 | Borck | |
| 3,703,642 A | 11/1972 | Balaguer | |
| 3,723,839 A | 3/1973 | Cramer | |
| 3,763,819 A | 10/1973 | Mays | |
| 3,797,448 A | 3/1974 | Cramer | |
| 3,809,006 A | 5/1974 | Finn | |
| 3,915,417 A | 10/1975 | Norton et al. | |
| 3,948,204 A | 4/1976 | Brock et al. | |
| 3,989,000 A * | 11/1976 | Foley, Jr. | B63H 20/007 |
| | | | 440/6 |
| 4,122,928 A * | 10/1978 | Smith | F16D 43/208 |
| | | | 192/56.56 |
| 4,300,888 A | 11/1981 | Warning | |
| 4,432,527 A | 2/1984 | Sample | |
| 4,555,233 A | 11/1985 | Klammer et al. | |
| 4,562,909 A | 1/1986 | Sigg et al. | |
| 4,832,630 A | 5/1989 | Alexander, Jr. et al. | |
| 4,836,809 A | 6/1989 | Pelligrino | |
| 4,841,203 A | 6/1989 | Gilbert | |
| 4,858,481 A | 8/1989 | Abraham | |
| 5,201,679 A | 4/1993 | Velte, Jr. et al. | |
| 5,277,630 A | 1/1994 | Clark | |
| 5,405,274 A | 4/1995 | Cook, III | |
| 5,582,526 A | 12/1996 | Cook, III | |
| 5,591,055 A | 1/1997 | Ambrico et al. | |
| 5,639,272 A | 6/1997 | Henderson et al. | |
| 5,743,350 A * | 4/1998 | Yamawaki | F16D 41/105 |
| | | | 180/444 |
| 5,809,924 A | 9/1998 | Ambrico et al. | |
| 6,213,821 B1 | 4/2001 | Bernloehr et al. | |
| 6,254,441 B1 | 7/2001 | Knight et al. | |
| 6,394,408 B1 | 5/2002 | Henderson et al. | |
| 6,394,859 B1 | 5/2002 | Knight et al. | |
| 6,396,161 B1 | 5/2002 | Crecelius et al. | |
| 7,086,914 B1 | 8/2006 | Beamer et al. | |
| 7,238,071 B2 | 7/2007 | Takada et al. | |
| 7,314,396 B2 | 1/2008 | Kubota et al. | |
| 7,442,102 B2 | 10/2008 | Ito et al. | |
| 7,473,148 B2 | 1/2009 | Ichikawa et al. | |
| 7,793,768 B2 | 9/2010 | Aschauer | |
| 8,337,266 B2 | 12/2012 | Ellis et al. | |
| 8,430,701 B2 | 4/2013 | Jegel et al. | |
| 8,439,715 B1 | 5/2013 | Clark | |
| 8,454,402 B1 | 6/2013 | Arbuckle et al. | |
| 8,814,614 B2 | 8/2014 | Suzuki et al. | |
| 9,290,256 B1 | 3/2016 | Wireman et al. | |
| 9,296,455 B2 | 3/2016 | Bernloehr et al. | |
| 9,352,818 B2 | 5/2016 | Reese | |
| 9,533,747 B2 | 1/2017 | Arbuckle et al. | |
| 9,836,048 B1 | 12/2017 | Widmaier | |
| 9,896,175 B2 | 2/2018 | Galletta, Jr. | |
| 9,994,296 B1 * | 6/2018 | Balogh | B63B 79/10 |
| 10,150,550 B2 | 12/2018 | Nakamura | |
| 10,507,897 B2 | 12/2019 | Nakamura | |
| 2007/0232157 A1 | 10/2007 | Lee | |
| 2012/0238159 A1 | 9/2012 | Palvoelgyi et al. | |
| 2014/0203162 A1 | 7/2014 | Logan | |
| 2020/0062365 A1 | 2/2020 | Anderson et al. | |

FOREIGN PATENT DOCUMENTS

| | | |
|---|---|---|
| EP | 0754619 A1 | 1/1997 |
| GB | 8704199 | 4/1987 |
| JP | 6056506 B2 | 1/2017 |
| JP | 6475582 B2 | 2/2019 |
| WO | WO-2017002875 A1 | 1/2017 |

* cited by examiner

| Parameter Chart | | | | |
|---|---|---|---|---|
| Feature | Low Value | Nominal Value | High Value | Unit |
| Trolling motor weight | 20 | 50 | 75 | lbs |
| Trolling motor horsepower | 0.33 | 1.5 | 5 | hp |
| Steering shaft length | 36 | 84 | 120 | in |
| Steering shaft diameter | 0.75 | 1.25 | 2.0 | in |
| Number of drive gear teeth | 10 | 35 | 75 | units |
| Number of driven gear teeth | 20 | 45 | 100 | units |
| Number of clutch teeth | 3 | 24 | 75 | units |
| Number of ball/detent interfaces | 2 | 6 | 12 | units |
| Ball and spring mechanism spring constant (k) | 5 | 35 | 250 | lbf/in |
| Slip tooth mechanism spring constant | 50 | 300 | 1,000 | lbf/in |
| Torque threshold magnitude | 50 | 100 | 200 | in-lbf |

FIG. 7

CLUTCH MECHANISMS FOR STEERING CONTROL SYSTEM

CROSS-REFERENCE TO RELATED APPLICATION

This application claims priority to and benefit of U.S. Provisional Patent Application No. 63/000,773 filed on Mar. 27, 2020 and titled "Clutch Mechanism for Steering Control System", the entirety of which is incorporated herein by reference.

TECHNICAL FIELD

The present invention generally relates to a steering system for a thruster (e.g., a trolling motor) and, more particularly, to clutching mechanisms that can prevent damage to the steering system when the motor is subjected to high loads.

BACKGROUND

Figure 1:
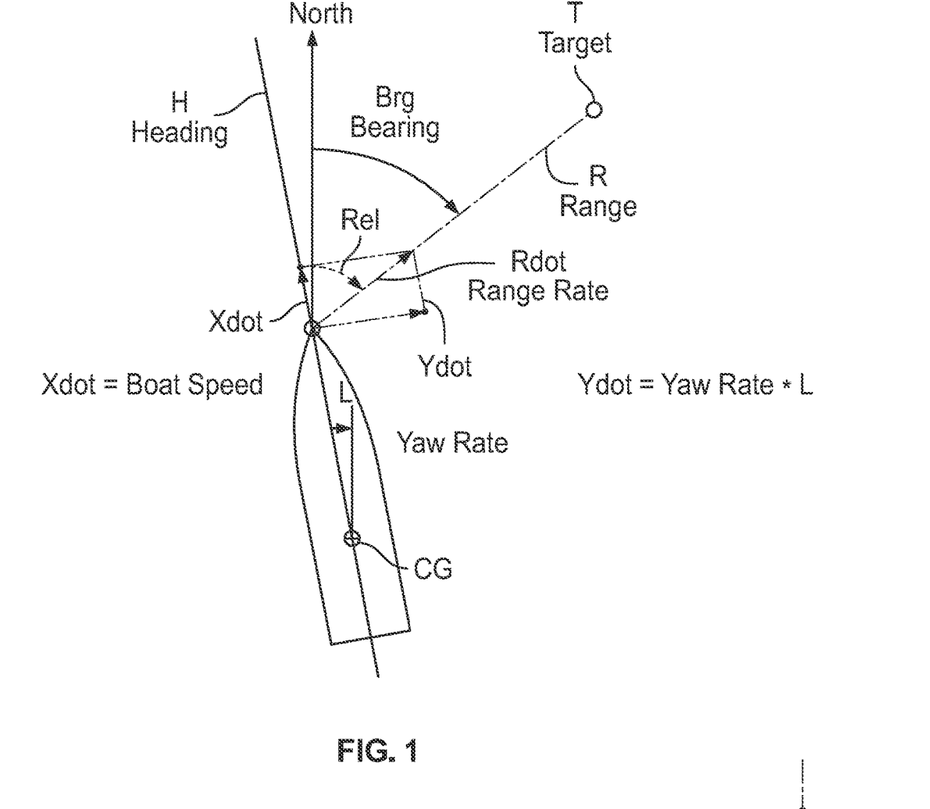
FIG. 1 is an example diagram depicting various forces that act on a boat, according to various embodiments.

A thruster is a generic term for a device that applies a thrust vector affecting the position and/or bearing of a vehicle (e.g., a boat), which typically includes a motor that drives a propeller. A thruster may include the boat's primary motor (i.e., a motor connected to the internal controls and steering mechanism of the boat) or one or more trolling motors (i.e., a self-contained electric motor that can be mounted/de-mounted from the boat and is generally smaller and less powerful than the primary motor). As shown in FIG. 1, external forces (e.g., wind, waves, etc.) can push a boat a particular distance (Range R) from a target position (T) and/or rotate the boat's Heading H a particular angular offset from the target position (T). Application of appropriate thrust vectors generated by thruster(s) can return the boat to the target position.

A typical trolling motor includes a steering control system located somewhere substantially above a main thruster, typically above the water line. Such systems often include a shaft to connect the steering controls to the main thruster. In some cases, the steering control system includes a dedicated motor that acts to rotate the shaft. While automated rotation of the shaft can be advantageous, existing steering control systems are often damaged or fail during operation of the boat/trolling motor. An improved steering control system that is less susceptible to damage and failure is needed.

SUMMARY

Embodiments of the invention described herein relate to an improved steering control system. This application will often describe the steering control system used to rotate the steering shaft of a marine trolling motor. However, the ideas described herein can apply to any steering of any type of motor (e.g., automobile, droid, machinery, etc.) and to any steering control action (e.g., crankshaft, linkage assembly, etc.). Applicant discovered and appreciated that the root cause of many failures of conventional steering control systems is some form of unplanned impact load that occurs during operation in the field. If an external load is applied gradually and the steering motor is not energized, the load will simply back drive the steering motor. However, if the steering motor is energized opposite the direction of the load, or if the load is applied too quickly, the torque and inertia of the trolling motor can cause the load on the steering control system to damage the gear train and/or steering motor. The impact loads can come from a wide variety of sources; for example, the trolling motor propeller contacting the ground or other obstructions (e.g., stump, dock), repeated torque loads from the trolling motor propeller leaving/entering the water at high thrust during rough water conditions, among many others. In some cases, the high impact load causes an immediate failure of the steering control system, while in other cases it creates a latent defect that surfaces at a later time.

As a solution to this previously unappreciated problem, embodiments of the present invention feature various clutch mechanisms that decouple the steering motor and transmission system (e.g., a gear train) from the steering shaft when the steering shaft is subjected to unusually high loads.

In general, in one aspect, embodiments of the invention feature a trolling motor steering control system. The system can include a steering motor, a steering shaft adapted to be rotated by the steering motor via a single ratio transmission system, and a torque clutch adapted to automatically axially decouple the steering motor from the steering shaft is subjected to an external torque exceeding a predetermined threshold magnitude and automatically axially recouple the steering motor to the steering shaft when the steering shaft is subjected to an external torque below the predetermined threshold magnitude.

In various embodiments, the steering motor can include a brushed DC motor. The steering shaft can include a length in a range from three to ten feet and can be coupled to a propeller unit adapted to be driven by a separate motor. In some embodiments, the steering shaft can include a plurality of vertebrae and at least one tension element threaded longitudinally through the plurality of vertebrae to link the vertebrae. At least a portion of the steering shaft can have a flexible configuration when the at least one tension element is released and a stiffened linear configuration when the tension element is tensed to react to torque and bending moments on the steering shaft. In some instances, the steering motor and at least a portion of the steering shaft are housed within an outer casing and, in some cases, longitudinal axes of the steering motor and the steering shaft are arranged parallel to each other within the outer casing. The transmission system can include a gear train, which may include a driving gear coupled to the steering motor and a driven gear coupled to the steering shaft. The gear train may not include an idler gear.

In some embodiments, the torque clutch is disposed between the steering motor and the transmission system. In other embodiments, the torque clutch is disposed between the transmission system and the steering shaft. In some embodiments, the torque clutch can include a tapered pin and spring mechanism. In some cases, the torque clutch includes a ball and spring mechanism. The ball and spring mechanism can include a plurality of ball/detent interfaces, wherein at each ball/detent interface a ball is adapted to be (i) disposed within a detent when the torque is below the predetermined threshold magnitude and (ii) displaced from the detent when the torque is above the predetermined threshold magnitude. The ball and spring mechanism can include a plurality of springs, each spring corresponding to one of the plurality of ball/detent interfaces. The ball and spring mechanism can include two balls disposed at each ball/detent interface.

In other cases, the torque clutch can include a slip tooth mechanism. The slip tooth mechanism can include a first toothed interface coupled to the steering shaft and a second mating toothed interface coupled to the transmission system, wherein (i) the first toothed interface and the second toothed interface maintain engagement when the external torque is below the predetermined threshold magnitude and (ii) the first toothed interface and the second toothed interface incrementally rotate relative to each other when the external torque is above the predetermined threshold magnitude. The slip tooth mechanism can further include a biasing element adapted to maintain engagement of the first toothed interface and the second toothed interface when the external torque is below the predetermined threshold magnitude. The biasing element can be a coil spring, a wave spring, a square cross section spring, and/or an o-ring. In some cases, the predetermined threshold magnitude is fixed.

In general, in another aspect, embodiments of the invention feature a method of manufacturing a trolling motor steering control system. The method can include the steps of coupling a steering motor to a steering shaft via a single ratio transmission system, such that the steering motor is adapted to rotate the steering shaft; and installing a torque clutch adapted to automatically axially decouple the steering motor from the steering shaft when the steering shaft is subjected to an external torque exceeding a predetermined threshold magnitude and automatically axially recouple the steering motor to the steering shaft when the steering shaft is subjected to an external torque below the predetermined threshold magnitude.

In various embodiments, the steering motor can include a brushed DC motor. The steering shaft can include a length in a range from three to ten feet. In some instances, the method can also include the step of coupling the steering shaft to a propeller unit adapted to be drive by a separate motor. In some instances, the method can also include housing the steering motor and at least a portion of the steering shaft within an outer casing. The housing step can include arranging longitudinal axes of the steering motor and the steering shaft parallel to each other within the outer casing. The transmission system can include a gear train. The gear train can include a driving gear and a driven gear and the method can further include coupling the driving gear to the steering motor and coupling the driven gear to the steering shaft. In some cases, the gear train does not include an idler gear.

In some embodiments, the step of installing the torque clutch includes disposing the torque clutch between the steering motor and the transmission system. In other embodiments, the step of installing the torque clutch includes disposing the torque clutch between the transmission system and the steering shaft. In some cases, the torque clutch includes a ball and spring mechanism. The ball and spring mechanism can include a plurality of ball/detent interfaces, wherein at each ball/detent interface a ball is adapted to be (i) disposed within a detent when the torque is below the predetermined threshold magnitude and (ii) displaced from the detent when the torque is above the predetermined threshold magnitude. The ball and spring mechanism can include a plurality of springs, each spring corresponding to one of the plurality of ball/detent interfaces. The ball and spring mechanism can include two balls disposed at each ball/detent interface.

In some embodiments, the torque clutch can include a slip tooth mechanism. The slip tooth mechanism can include a first toothed interface coupled to the steering shaft and a second mating toothed interface coupled to the transmission system, wherein (i) the first toothed interface and the second toothed interface maintain engagement when the external torque is below the predetermined threshold magnitude and (ii) the first toothed interface and the second toothed interface incrementally rotate relative to each other when the external torque is above the predetermined threshold magnitude. The slip tooth mechanism can include a biasing element adapted to maintain engagement of the first toothed interface and the second toothed interface when the external torque is below the predetermined threshold magnitude. The biasing element can include a coil spring, a wave spring, a square cross section spring, and/or an o-ring. In some cases, the predetermined threshold magnitude is fixed.

BRIEF DESCRIPTION OF THE DRAWINGS

In the drawings, like reference characters generally refer to the same parts throughout the different views. In the following description, various embodiments of the present invention are described with reference to the following drawings, in which.

DETAILED DESCRIPTION

Figure 2A:
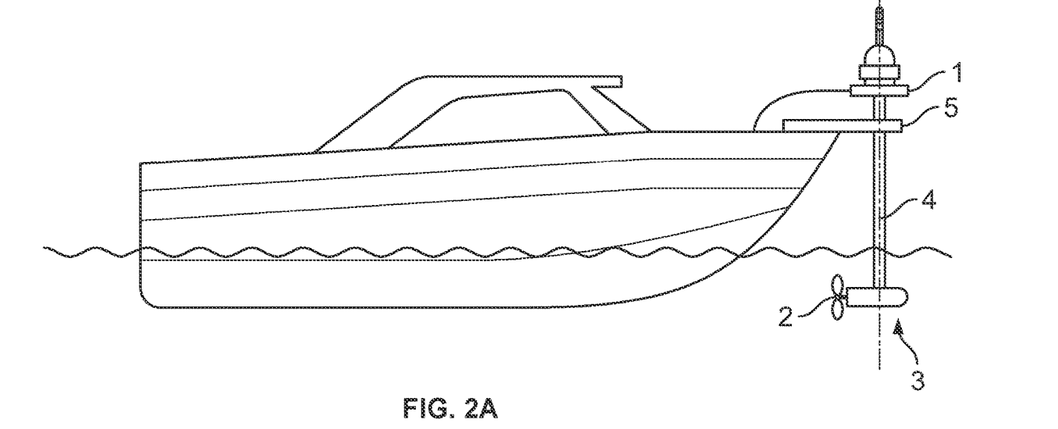
FIG. 2A is a side schematic view of a trolling motor with a steering control system, according to various embodiments.
Figure 2B:
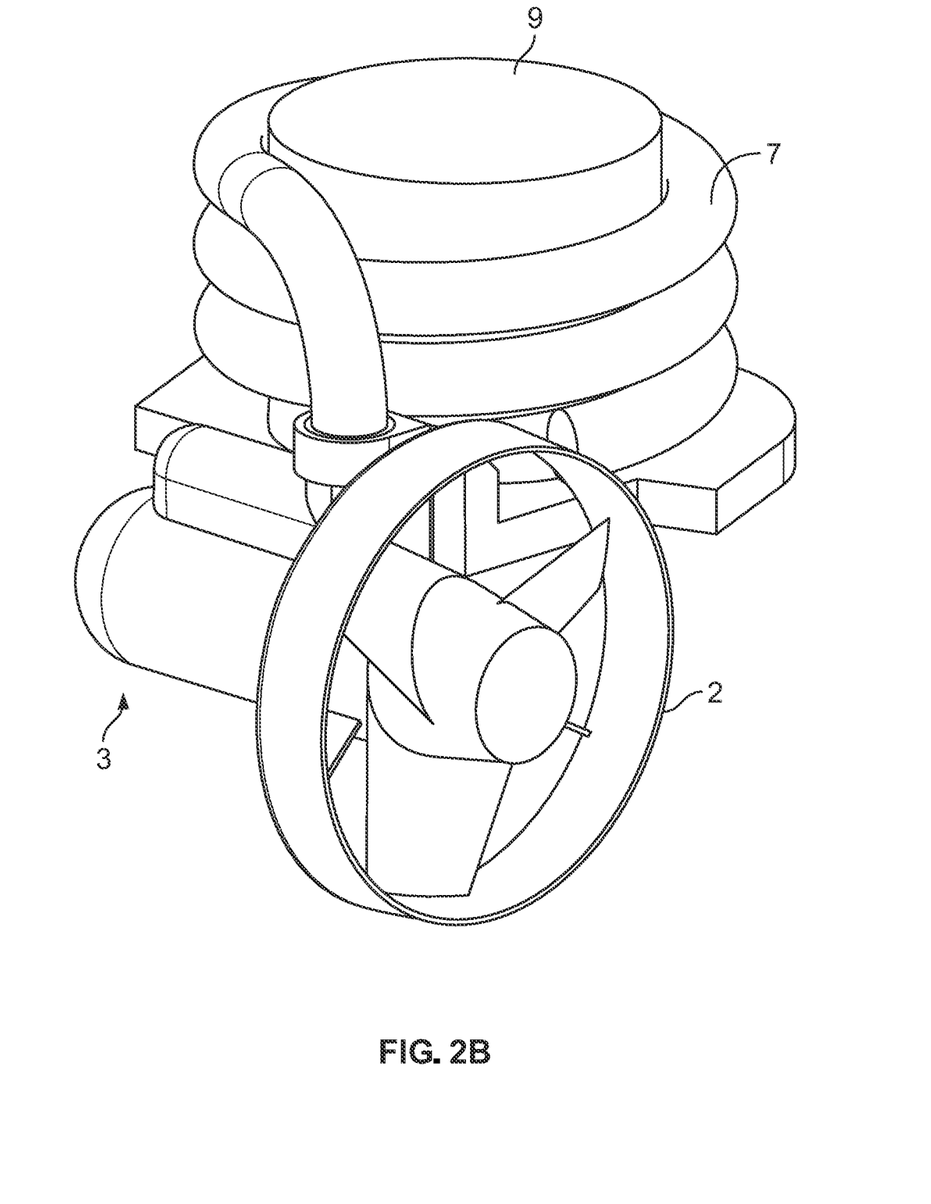
FIG. 2B is a perspective diagram of a trolling motor connected to a stiffening shaft, according to various embodiments.

In various embodiments, the present invention is directed to an improved steering control system. With reference to FIG. 2A, the steering control system 1 can operate to rotate a steering shaft 4, thereby rotating a main thruster unit 3, which can include a propeller 2. The steering shaft 4 can be connected to the main thruster unit 3 via a mount 5 that permits rotation of the steering shaft 4. The steering shaft 4 can have a length in a range from three feet (36 inches) to ten feet (120 inches), or in some cases above or below this range. Example lengths of the steering shaft are 84 inches and 96 inches. In some embodiments, the steering shaft 4 is a stiffening shaft. An example stiffening shaft can include a set of stacked 'vertebrae' coupled to one or more tension elements, that enable the shaft to flex for compact storage and stiffen (e.g., unfurl) into a rigid linear configuration. The stiffening of the shaft can be advantageous whether used for mounting a propeller motor, shallow anchoring, or other objective. FIG. 2B illustrates an example stiffening shaft 7 that is connected to main thruster unit 3. In this example, the stiffening shaft 7 is wound over a guiding system 9 that enables the stiffening shaft 7 to collapse into a compact form. Examples of stiffening shafts can be found in U.S. Publication No. 2020/0290714 A1 published on Sep. 17, 2020 and titled "Stiffening Shafts for Marine Environments", which is incorporated herein by reference in its entirety.

In general, in various embodiments, the invention includes any mechanism that decouples a motor of a steering control system 1 from a steering shaft 4, when the steering shaft 4 is subjected to a particular threshold load. The threshold load can vary by application, but in general it can be a load that is predetermined to cause damage to the motor, transmission, or other components of the steering control system 1. In some embodiments, the decoupling of the motor and the steering shaft is an axial decoupling. As used herein, the term axial decoupling refers to an axial displacement of one or more components of the clutch, as distinguished from clutching mechanisms that operate solely on a frictional interface and/or a purely radial displacement and/or a purely circumferential displacement. Axial displacement can be displacement along a longitudinal axis of the steering motor 8 and/or the steering shaft 4.

Figure 3A:
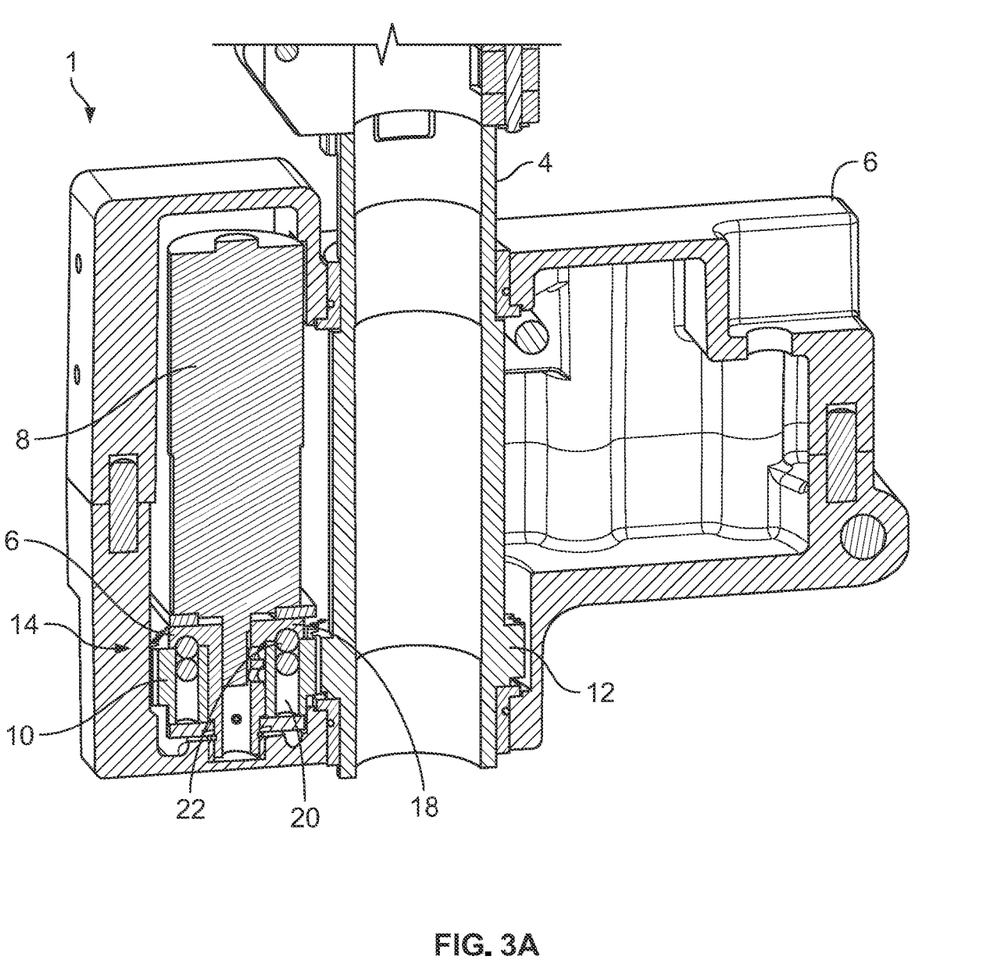
FIG. 3A is a schematic cross section view of a ball and spring mechanism clutch, according to various embodiments.

In some embodiments, the mechanism includes a ball and spring mechanism clutch. FIG. 3A is a cross sectional view of an example steering control system 1 including a ball and spring mechanism clutch 14. As shown, the steering control system 1 can include a steering motor 8 that engages a transmission system, e.g., a drive gear 10 and driven gear 12, that drives rotation of the steering shaft 4. In some instances, the transmission system only includes two gears with a fixed ratio and does not include any idler or additional gears often found in other applications where multiple gearing ratios or configurations are desired. The motor 8 and steering shaft 4, as well as the other components of the steering control system 1, can be contained within an outer casing 6. In general, the steering motor 8 and the steering shaft 4 can be arranged within the outer casing 6 in any desired orientation, e.g., with the longitudinal axes of the steering motor 8 and the steering shaft 4 parallel to each other, as shown for example in FIG. 3A.

In various embodiments, the ball and spring mechanism clutch 14 includes a clutch hub 16 that forms at least one detent 18. The clutch hub 16 can be attached to an output shaft of the steering motor 8 using any known technique, e.g., a set screw, a threaded interface, etc. In such embodiments, the drive gear 10 can include at least one hole that houses a spring 20 and at least one ball 22. The at least one hole of the drive gear 10 can be configured to align with the at least one detent 18 of the clutch hub 16, such that the topmost ball 22 within the hole is disposed within the at least one detent 18 to form at least one ball/detent interface. In general, any suitable number of holes, detents 18, and ball/detent interfaces can be used, e.g., 2, 3, 4, 5, 6, 7, 8, 10, or 12.

In operation, the springs 20 apply a preload to the balls 22. The springs 20 can be selected (e.g., spring constant and/or spring length) such that when the predetermined torque magnitude threshold is exceeded, the balls 22 compress the springs 20 enough such that the balls 22 are removed from the detents 18, which allows the clutch hub 16 to rotate on top of the drive gear 10 without transmitting torque from the steering motor 8 to the drive gear 10, thereby decoupling the steering motor 8 from the steering shaft 4. Each detent 18 on the clutch hub 16 may encounter different balls 22 as it rotates on top of the drive gear 10, but as long as the torque remains above the threshold magnitude the balls 22 will not transmit torque from the clutch hub 16 to the drive gear 10 and instead be withdrawn from the detent 18. In some instances, the action of different balls 22 being inserted into and quickly removed from each detent 18 can generate an audible sound that alerts an operator that an over torque condition exists. Once the torque applied from the steering shaft 4 drops below the threshold magnitude, the next time the detents 18 engage the balls 22, the clutch hub 16 is able to transmit torque from the steering motor 8 to the drive gear 10, thereby recoupling the steering motor 8 to the steering shaft 4, without the need for any intervention by an operator or mechanic.

Figure 4:
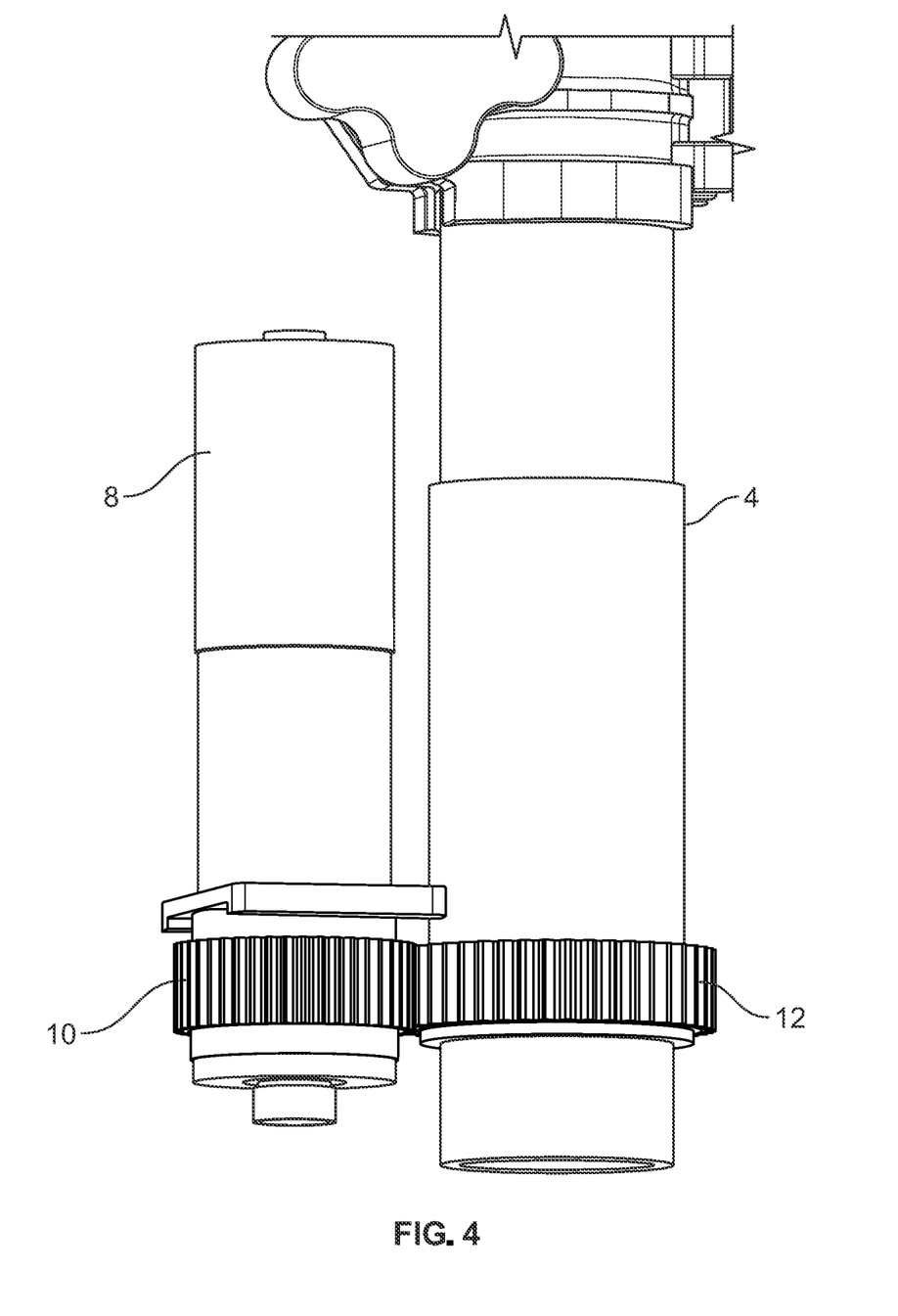
FIG. 4 is a schematic perspective view of the steering control system that includes the ball and spring mechanism clutch, according to various embodiments.

In general, any suitable number of balls 22 can be disposed on top of the spring 20 in each hole in the drive gear 10; for example, one ball, two balls, three balls, or four balls. In some instances, use of two balls can be advantageous because the topmost ball is subjected to radial and circumferential forces during rotation of the clutch hub 16 which can detract from the downward compressive force applied to the spring 20. Adding a second ball beneath the topmost ball can provide a more defined sphere-to-sphere contact point for the topmost ball to apply force on, and the lower ball may react the circumferential and radial forces better than the top of the spring 20. Thus, the contact point between the lower ball and the spring 20 can be more stable and allow for a more consistent compressive force to be applied to the spring 20. FIG. 4 is a schematic perspective view of the steering control system 1 including the ball and spring mechanism clutch.

Figure 3B:
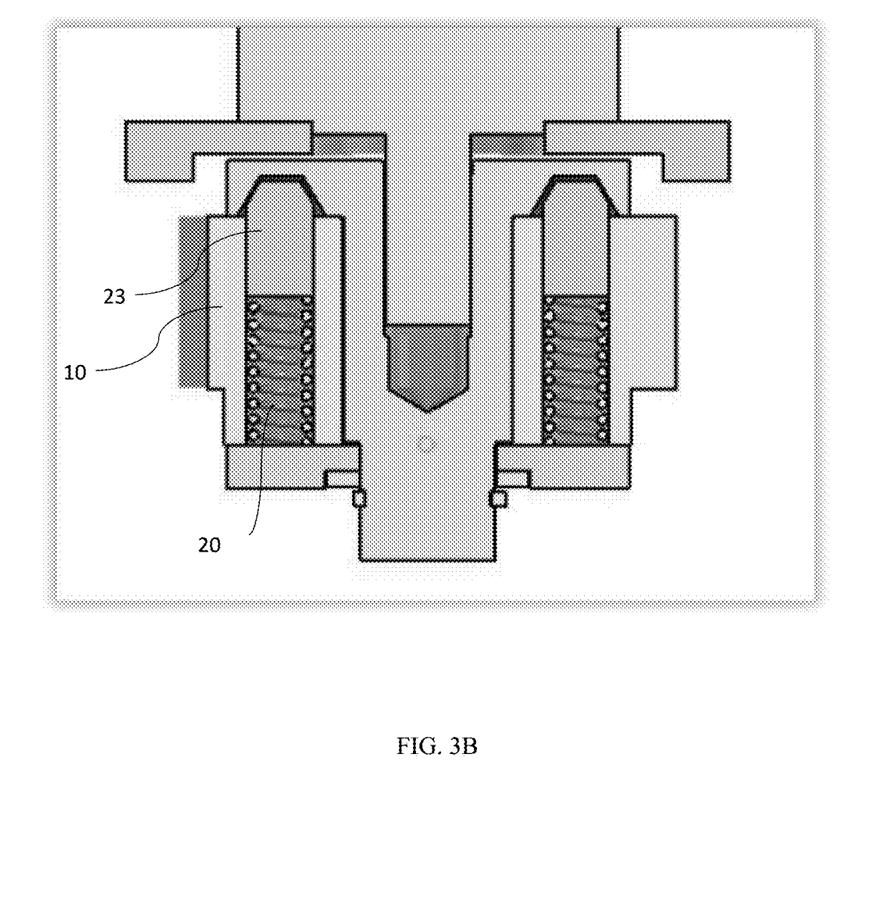
FIG. 3B is a schematic cross sectional view of a tapered pin and spring mechanism clutch, according to various embodiments.

In some embodiments, the balls 22 can be replaced by pins, which in some cases have one or both tapered ends. For example, instead of two balls 22 the clutch can include two pins arranged on top of each other or, in some cases, a single pin having a length of approximately twice a diameter of its cross section (in some cases this can prevent the pin from binding in the hole under a side load). In general, any suitable absolute and relative dimensions of the balls 22 or pins can be used. In some instances, use of pins can result in more stable performance. The pins can also increase contact area, which can reduce component wear and reduce the hardness requirements of the components. FIG. 3B illustrates an example steering control system that includes tapered pins 23 (e.g., in place of the balls 22).

Figure 5:
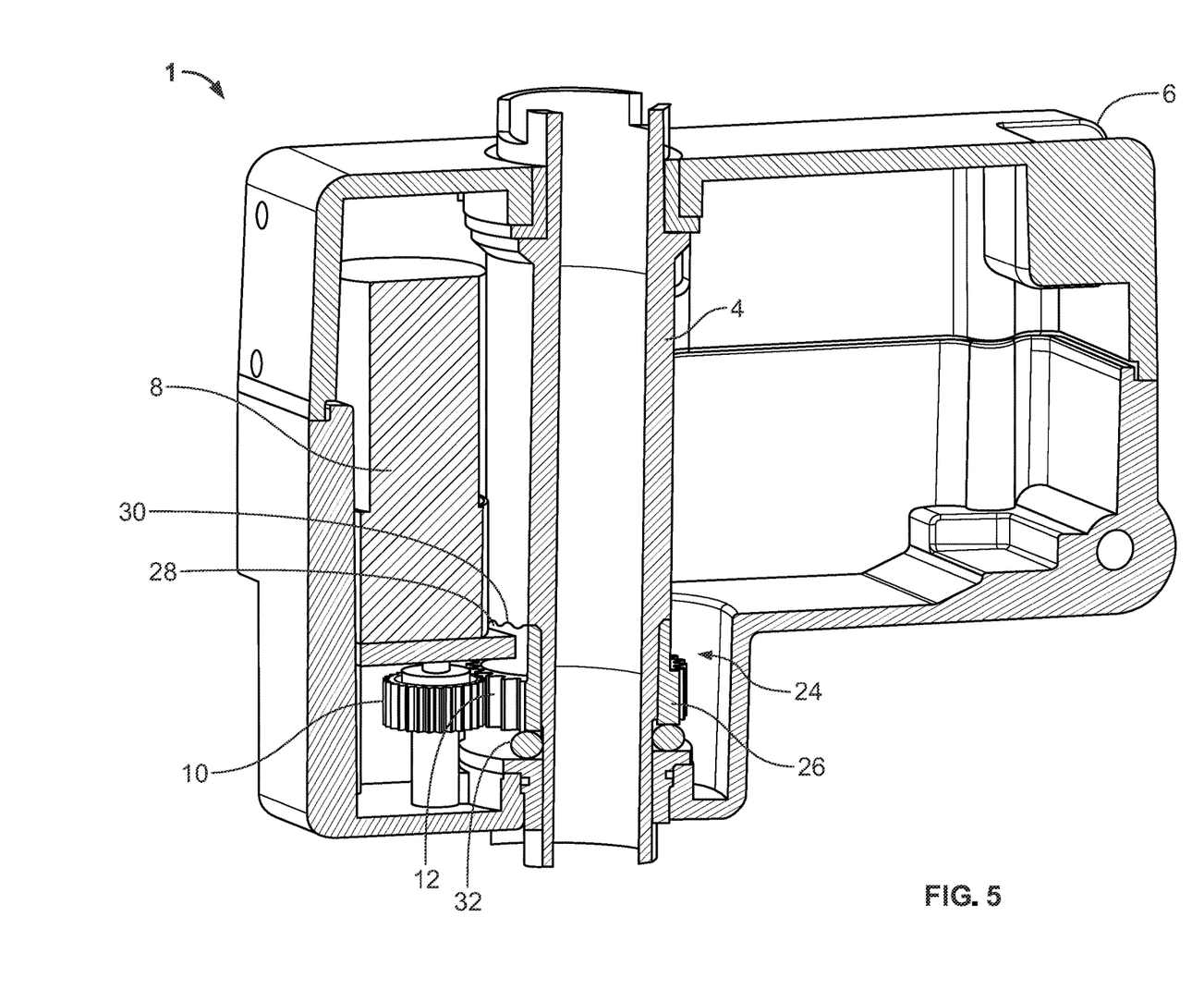
FIG. 5 is a schematic cross section view of a slip tooth mechanism clutch, according to various embodiments.

In some embodiments, the clutch mechanism includes a slip tooth mechanism clutch. FIG. 5 is a cross sectional view of an example steering control system 1 including a slip tooth mechanism clutch 24. As shown, the steering control system 1 can include a steering motor 8 that engages a transmission system, e.g., a drive gear 10 and driven gear 12, that drives rotation of the steering shaft 4. In some instances, the transmission system only includes two gears with a fixed ratio and does not include any idler or additional gears often found in other applications where multiple gearing ratios or configurations are desired. The motor 8 and steering shaft 4, as well as the other components of the steering control system 1, can be contained within an outer casing 6. In general, the steering motor 8 and steering shaft 4 can be arranged within the outer casing 6 in any desired orientation, e.g., with the longitudinal axes of the steering motor 8 and the steering shaft 4 parallel to each other, as shown for example in FIG. 5.

In various embodiments, the slip tooth mechanism clutch 24 includes a clutch hub 26 attached to the driven gear 12 and coupled to the steering shaft 4. In general, any coupling technique can be used, so long as when a threshold torque magnitude is applied to the steering shaft 4, the clutch hub 26 disengages from the steering shaft 4, thereby decoupling the steering shaft 4 from the steering motor 8. For example, the clutch hub 26 can include a first toothed interface 28 that mates with a second toothed interface 30 on the steering shaft 4. In some embodiments, the teeth of interfaces 28, 30 are designed to remain engaged when the torque is below the threshold torque magnitude and to slip or disengage when the torque exceeds the threshold torque magnitude.

In some embodiments, other components can be used to facilitate proper engagement and slipping of the interfaces 28, 30. For example, as shown in FIG. 5, clutch hub 26 is mounted on top of a pre-loaded spring 32. As torque is applied by the steering shaft 4, the meshing of the interfaces 28, 30 applies a compressive force onto the preloaded spring 32. The spring 32 is designed to counteract the downward force to keep the interfaces 28, 30 engaged when the torque is below the threshold magnitude, but once the threshold magnitude is exceeded, the spring 32 compresses enough that the interfaces 28, 30 disengage, thereby decoupling the steering shaft 4 from the clutch hub 26 and driven gear 12 (and ultimately the steering motor 8). In general, the preload spring 32 can be any type of spring, e.g., a coil spring, a wave spring, a square cross section spring, and an o-ring.

Figure 6:
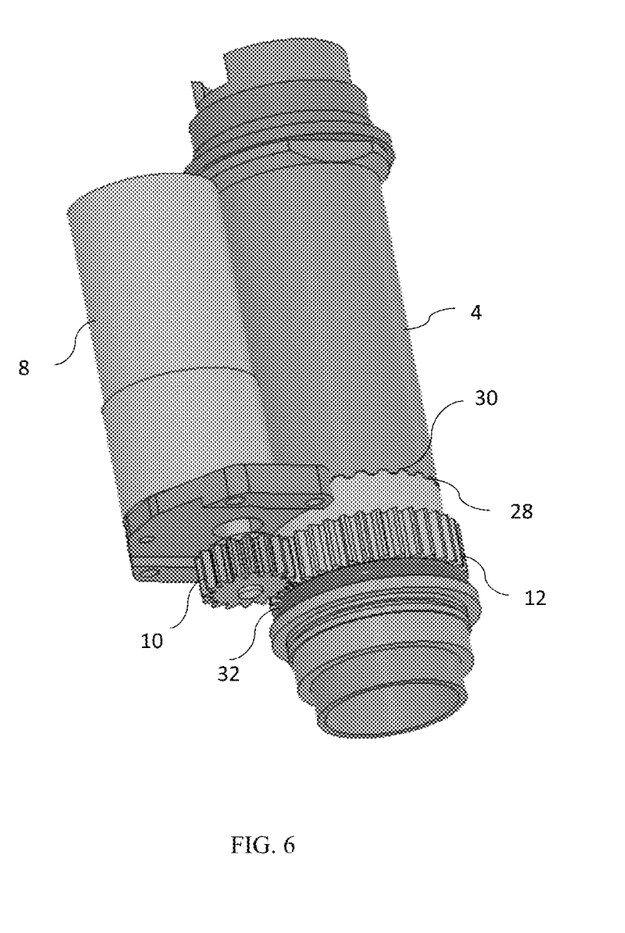
FIG. 6 is a schematic perspective view of the steering control system that includes the slip tooth mechanism clutch, according to various embodiments.

In some instances, the action of the teeth of interfaces 28, 30 rotating over each other generates an audible sound that alerts an operator that an over torque condition exists. Once the torque applied from the steering shaft 4 drops below the threshold magnitude, the interfaces 28, 30 can reengage and resume transmitting torque between each other, thereby recoupling the steering motor 8 to the steering shaft 4, without the need for any intervention by an operator or mechanic. FIG. 6 is a schematic perspective view of the steering control system 1 including the slip tooth mechanism clutch.

While this application has described the ball and spring mechanism clutch 14 as interacting the drive gear 10 and the steering motor 8 and the slip tooth mechanism clutch 24 as interacting with the driven gear 12 and the steering shaft 4; in other embodiments, the ball and spring mechanism clutch 14 can interact with the driven gear 12 and the steering shaft 4 and the slip tooth mechanism clutch 24 can interact with the drive gear 10 and the steering motor 8. In some embodiments, both types of clutches 14, 24 can be used in either or both locations.

In various embodiments, an advantage of the clutches described herein can include having significantly lower backlash than in conventional clutch arrangements (e.g., the clutch arrangement found in some electric drills). As used herein, the term backlash refers to a distance (rotation or translation) that components need to travel in order for the clutch mechanism to engage. In many conventional clutch arrangements, there is significant backlash. As one example, in electric drills, the clutch can rotate up to 100° before engaging. Conversely, the clutches described herein have significantly lower backlash (e.g., rotating less than 30°, less than 20°, less than 15°, less than 10°, less than 5°, less than 3°), and in some cases near zero backlash.

Figure 7:
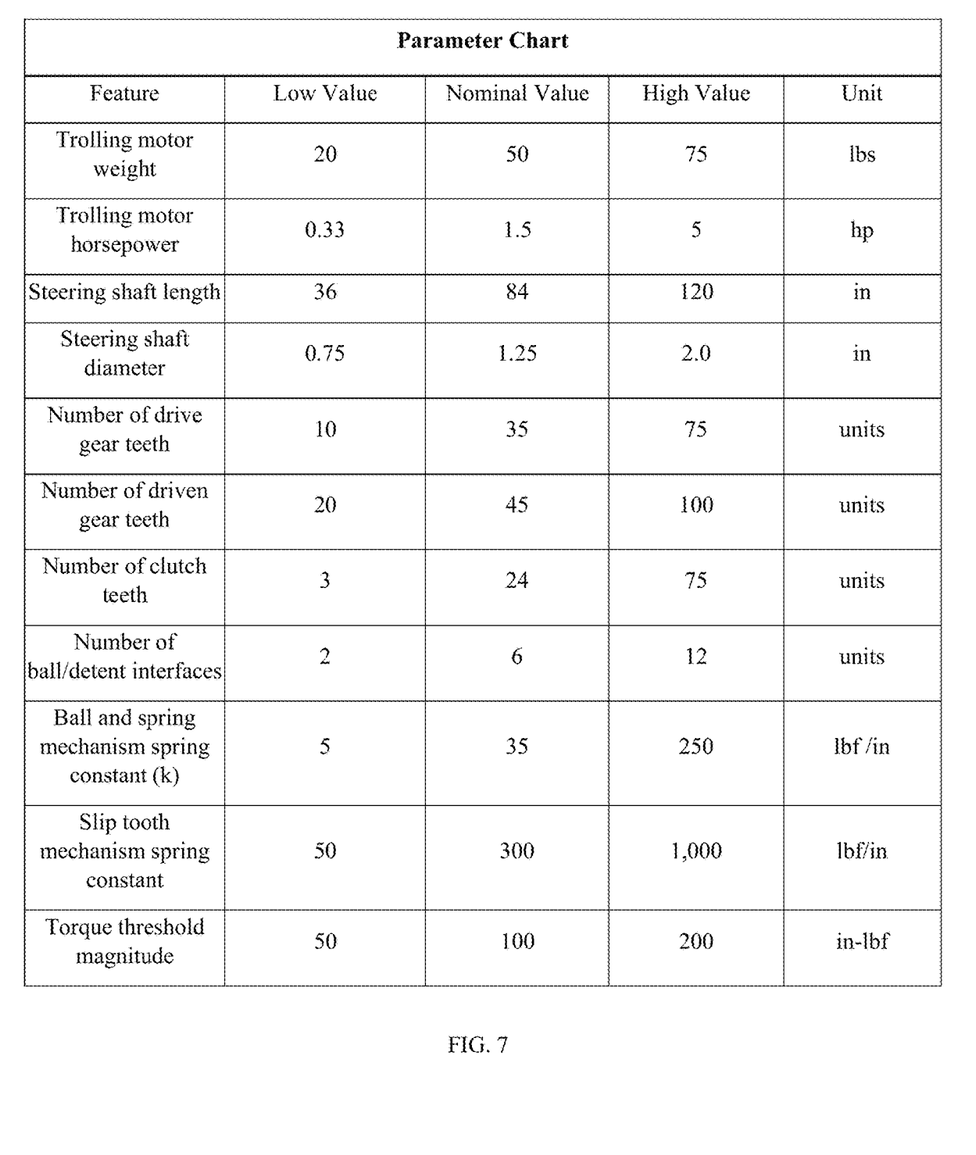
FIG. 7 is a parameter chart listing example low, nominal, and high values of various parameters related to the steering control system, according to various embodiments.

FIG. 7 is a chart including example parameters related to the steering control system 1. Each numerical value presented herein is contemplated to represent a minimum value or a maximum value in a range for a corresponding parameter. Accordingly, when added to the claims, the numerical value provides express support for claiming the range, which may lie above or below the numerical value, in accordance with the teachings herein. Every value between the minimum value and the maximum value within each numerical range presented herein (including the low, nominal, and high values shown in the chart shown in FIG. 7), is contemplated and expressly supported herein, subject to the number of significant digits expressed in each particular range.

Having described herein illustrative embodiments of the present invention, persons of ordinary skill in the art will appreciate various other features and advantages of the invention apart from those specifically described above. It should therefore be understood that the foregoing is only illustrative of the principles of the invention, and that various modifications and additions, as well as all combinations and permutations of the various elements and components recited herein, can be made by those skilled in the art without departing from the spirit and scope of the invention. Accordingly, the appended claims shall not be limited by the particular features that have been shown and described but shall be construed also to cover any obvious modifications and equivalents thereof.

What is claimed is:

1. A trolling motor steering control system comprising:
a steering motor;
a steering shaft adapted to be rotated by the steering motor via a single ratio transmission system; and
a torque clutch comprising a tapered pin and spring mechanism, wherein the torque clutch is adapted to automatically axially decouple the steering motor from the steering shaft when the steering shaft is subjected to an external torque exceeding a predetermined threshold magnitude and automatically axially recouple the steering motor to the steering shaft when the steering shaft is subjected to an external torque below the predetermined threshold magnitude.

2. The steering control system of claim 1, wherein the steering motor comprises a brushed DC motor.

3. The steering control system of claim 1, wherein the steering shaft comprises a length in a range from three to ten feet.

4. The steering control system of claim 3, wherein the steering shaft comprises a plurality of vertebrae and at least one tension element threaded longitudinally through the plurality of vertebrae to link the vertebrae,
wherein at least a portion of the steering shaft has a flexible configuration when the at least one tension element is released and a stiffened linear configuration when the tension element is tensed to react to torque and bending moments on the steering shaft.

5. The steering control system of claim 1, wherein the steering shaft is coupled to a propeller unit adapted to be driven by a separate motor.

6. The steering control system of claim 1, wherein the steering motor and at least a portion of the steering shaft are housed within an outer casing.

7. The steering control system of claim 6, wherein longitudinal axes of the steering motor and the steering shaft are arranged parallel to each other within the outer casing.

8. The steering control system of claim 1, wherein the transmission system comprises a gear train.

9. The steering control system of claim 8, wherein the gear train comprises a driving gear coupled to the steering motor and a driven gear coupled to the steering shaft.

10. The steering control system of claim 9, wherein the gear train does not include an idler gear.

11. The steering control system of claim 1, wherein the torque clutch is disposed between the steering motor and transmission system.

12. The steering control system of claim 1, wherein the torque clutch is disposed between the transmission system and the steering shaft.

13. The steering control system of claim 1, wherein the torque clutch comprises a ball and spring mechanism.

14. The steering control system of claim 13, wherein the ball and spring mechanism comprises a plurality of ball/detent interfaces, wherein at each ball/detent interface a ball is adapted to be (i) disposed within a detent when the torque is below the predetermined threshold magnitude and (ii) displaced from the detent when the torque is above the predetermined threshold magnitude.

15. The steering control system of claim 14, wherein the ball and spring mechanism comprises a plurality of springs, each spring corresponding to one of the plurality of ball/detent interfaces.

16. The steering control system of claim 15, wherein the ball and spring mechanism comprises two balls disposed at each ball/detent interface.

17. The steering control system of claim 1, wherein the torque clutch comprises a slip tooth mechanism.

18. The steering control system of claim 17, wherein the slip tooth mechanism comprises a first toothed interface coupled to the steering shaft and a second mating toothed interface coupled to the transmission system, wherein (i) the first toothed interface and the second toothed interface maintain engagement when the external torque is below the predetermined threshold magnitude and (ii) the first toothed interface and the second toothed interface incrementally rotate relative to each other when the external torque is above the predetermined threshold magnitude.

19. A method of manufacturing a trolling motor steering control system, the method comprising the steps of:
coupling a steering motor to a steering shaft via a single ratio transmission system, such that the steering motor is adapted to rotate the steering shaft; and
installing a torque clutch adapted to automatically axially decouple the steering motor from the steering shaft when the steering shaft is subjected to an external torque exceeding a predetermined threshold magnitude and automatically axially recouple the steering motor to the steering shaft when the steering shaft is subjected to an external torque below the predetermined threshold magnitude,
wherein the torque clutch comprises a tapered pin and spring mechanism.

20. A trolling motor steering control system comprising:
a steering motor;
a steering shaft adapted to be rotated by the steering motor via a single ratio transmission system, wherein the steering shaft comprises a length in a range from three to ten feet; and
a torque clutch adapted to automatically axially decouple the steering motor from the steering shaft when the steering shaft is subjected to an external torque exceeding a predetermined threshold magnitude and automatically axially recouple the steering motor to the steering shaft when the steering shaft is subjected to an external torque below the predetermined threshold magnitude;
wherein the steering shaft comprises a plurality of vertebrae and at least one tension element threaded longitudinally through the plurality of vertebrae to link the vertebrae, and wherein at least a portion of the steering shaft has a flexible configuration when the at least one tension element is released and a stiffened linear configuration when the tension element is tensed to react to torque and bending moments on the steering shaft.

21. A trolling motor steering control system comprising:
a steering motor;
a steering shaft adapted to be rotated by the steering motor via a single ratio transmission system; and
a torque clutch adapted to automatically axially decouple the steering motor from the steering shaft when the steering shaft is subjected to an external torque exceeding a predetermined threshold magnitude and automatically axially recouple the steering motor to the steering shaft when the steering shaft is subjected to an external torque below the predetermined threshold magnitude,
wherein the torque clutch comprises a ball and spring mechanism, and
wherein the ball and spring mechanism comprises a plurality of ball/detent interfaces, wherein at each ball/detent interface a ball is adapted to be (i) disposed within a detent when the torque is below the predetermined threshold magnitude and (ii) displaced from the detent when the torque is above the predetermined threshold magnitude.

22. The steering control system of claim 21, wherein the ball and spring mechanism comprises a plurality of springs, each spring corresponding to one of the plurality of ball/detent interfaces.

23. The steering control system of claim 22, wherein the ball and spring mechanism comprises two balls disposed at each ball/detent interface.

24. A trolling motor steering control system comprising:
a steering motor;
a steering shaft adapted to be rotated by the steering motor via a single ratio transmission system; and
a torque clutch adapted to automatically axially decouple the steering motor from the steering shaft when the steering shaft is subjected to an external torque exceeding a predetermined threshold magnitude and automatically axially recouple the steering motor to the steering shaft when the steering shaft is subjected to an external torque below the predetermined threshold magnitude,
wherein the torque clutch comprises a slip tooth mechanism comprising a first toothed interface coupled to the steering shaft and a second mating toothed interface coupled to the transmission system, wherein (i) the first toothed interface and the second toothed interface maintain engagement when the external torque is below the predetermined threshold magnitude and (ii) the first toothed interface and the second toothed interface incrementally rotate relative to each other when the external torque is above the predetermined threshold magnitude.

* * * * *